(No Model.)

G. R. VALENTINE.
COUNTERSINK.

No. 332,308. Patented Dec. 15, 1885.

Witnesses.
R. C. Nelson,
K. F. Steele,

Inventor.
George R. Valentine.
R. W. Steele
Atty.

UNITED STATES PATENT OFFICE.

GEORGE R. VALENTINE, OF NEW BEDFORD, MASSACHUSETTS.

COUNTERSINK.

SPECIFICATION forming part of Letters Patent No. 332,308, dated December 15, 1885.

Application filed October 1, 1884. Serial No. 144,500. (No model.)

*To all whom it may concern:*

Be it known that I, GEORGE R. VALENTINE, a citizen of the United States of America, residing at New Bedford, in the county of Bristol and State of Massachusetts, have invented certain new and useful Improvements in Countersinks, of which the following is a specification, reference being had therein to the accompanying drawings, forming a part thereof.

My invention is an improved countersink, and embraces the following novel features: a drill-holding tube having a drill following and countersinking point, and several open counter-slots regularly and diametrically cut through its body and extending part way its length from butt to point, all of which and their purposes are hereinafter more fully described, and illustrated by the accompanying drawings, in which like letters designate identical parts of said device in the different figures, respectively.

Figure 1:
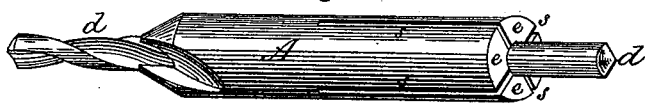
Figure 2:
Figure 3:
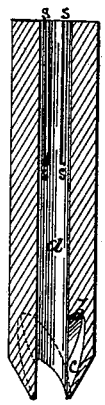

Figure 1 is a perspective view of said device, showing a twist-drill held within its bore, one of its pair of countersinking and drill-following cutters, and the quadripartite or diametrically-slotted portion of its tubular body. Fig. 2 is a similar view of the same without any drill. Fig. 3 is a plan view of a longitudinal section of said device, showing the diametrical half of its drill-holding stock-bore, the farther two of said quadruply-dividing slots, and the reaming-edges of the countersinking-cutters, the farther one in dotted outlines.

The object of said invention is to adaptively use any ordinarily-constructed twist-drill, so that while said drill is firmly held by the elastic clasping of the quadruply-slotted portion of said countersink in a chuck or other lathe-holder a hole and its countersink of any desired depth each shall be successively and safely drilled, and by said combination of inclosed drill and clamping countersink with the jaws of a chuck or other such holder to avoid all liability of fracturing the drill during the torsional strain of drilling, for almost, if not quite, all the drills now used with countersink-stocks are tightened in place by set-screws before being clamped in the lathe by chuck or other holder, thereby rendering the shank of the drill, especially if a small and slender one, which has to undergo the said strain of both drill and countersink cutters, liable to be broken or otherwise damaged.

A represents said countersink, which consists of a tubular stock, of suitable dimensions, having the suitably-tapering point, and the concentric bore *a*, extending throughout its entire length, as shown. Into said tapering or concentrically-beveled point are oppositely cut or formed the pair of inwardly-sloping and semi-elliptic grooves *b*, having each an outer countersink-cutting edge, *c*, as shown, which together make the concentric countersink to the hole just bored by the twist-drill *d*, held within said bore *a*, as shown. Said countersink-tube A is also furnished with the quadruple counter-slots *s*, which are cut diametrically across each other and the bore *a* into the butt-end of said tube about half-way down its length, dividing this portion of the drill-stock countersink into said quadripartite strips *e*, as shown, which strips concentrically close toward each other and clasp and tightly hold the inclosed drill-shank when it and said strip end of said tube are in and clamped by said lathe-chuck or other holder.

It will be readily observed that in addition to the new and useful results accomplished by said countersink and drill-tube combination, as already stated, said device and drill are more easily, quickly, and strongly put together, are more firmly and safely clamped in said lathe holders, and, besides, are more readily and quickly taken from said lathe-holder, taken apart, and readjusted in said lathe than any of said countersink devices now in use.

Therefore what I claim as new, and desire to secure by Letters Patent, is—

The countersink having, in combination with its drill-holding tube-bore, the pair of semi-elliptic and countersinking grooves, and the diametrically-crossing strip-slots, substantially as and for the purposes herein specified.

GEO. R. VALENTINE.

Attest:
CHAS. S. KELLEY,
A. E. ROBBINS.